United States Patent [19]

Taylor

[11] 4,133,269
[45] Jan. 9, 1979

[54] RETRACTABLE RAILROAD WHEEL ASSEMBLY FOR ROAD VEHICLE

[76] Inventor: Glenn E. Taylor, P.O. Box 93006 Martech Sta., Atlanta, Ga. 30318

[21] Appl. No.: 799,370

[22] Filed: May 23, 1977

[51] Int. Cl.² .......................................... B62D 61/12
[52] U.S. Cl. ............................ 105/215 C; 105/215 R
[58] Field of Search ............... 105/215 C, 215 R, 177, 105/216, 217; 104/247

[56] References Cited

U.S. PATENT DOCUMENTS

| | | | |
|---|---|---|---|
| 3,263,628 | 8/1966 | Grove et al. | 105/215 C |
| 3,730,105 | 5/1973 | Holley | 105/215 C |
| 4,048,925 | 9/1977 | Storm | 105/215 C |

Primary Examiner—Albert J. Makay
Assistant Examiner—Carl Rowold
Attorney, Agent, or Firm—Jones, Thomas & Askew

[57] ABSTRACT

The retractable railroad wheel assembly for a road vehicle includes an axle for placement beneath a vehicle which extends across the normal direction of movement of the vehicle, and railroad wheels mounted on the ends of the axle. A pair of linkage assemblies are mounted at each end of the axle inwardly of the wheels for connection to the vheicle, and each linkage assembly includes a wheel support arm pivotally connected at one of its ends to a first support bearing mounted on the vehicle and connected at its other end to the axle for moving the axle and wheels through an arc beneath the vehicle between an upwardly retracted position beneath the vehicle and a downwardly distended position where the wheels engage the rails of a railroad track. An actuating linkage is connected between the axle and another support bearing mounted on the vehicle and includes a fluid actuated ram for folding and unfolding the linkage to retract and distend the wheels. The ram and actuating linkage are proportioned so that the ram and linkage have their greatest downward effective forces applied to the wheels as the wheels first engage the railroad tracks and begin to support the vehicle from the tracks.

6 Claims, 4 Drawing Figures

RETRACTABLE RAILROAD WHEEL ASSEMBLY FOR ROAD VEHICLE

BACKGROUND OF THE INVENTION

This invention relates to a retractable and distensible railroad wheel assembly for attachment to a road vehicle that enables the road vehicle to travel along a railroad track.

In the past, various self-propelled vehicles have been developed which can travel over a normal flat road surface and which also travel on railroad tracks. Usually, the prior art vehicles have been vehicles that have been modified to include railroad wheels that can be attached to the vehicle for railroad track travel. In some instances, retractable and distensible railroad wheel assemblies have been combined with road vehicles which enable the road vehicles to be converted from a road vehicle to a rail-mounted vehicle when the vehicle is to move from the road surface to the railroad track. The road driving wheels of some of the prior art vehicles also engage the track and propel the vehicle along the track and the vehicles can be used for various load carrying jobs and maintenance jobs on a railroad track.

SUMMARY OF THE INVENTION

Briefly described, the present invention comprises a retractable and distensible railroad wheel assembly for road vehicles which is of relatively lightweight construction and yet is fast-acting, reliable and provides enough stability for the vehicle on the railroad tracks to enable the vehicle to carry heavy loads and to dump loads to the side of the railroad track and still allow the road wheels to bear part of the load and to propel the vehicle along the track. The retractable and distensible roalroad wheel assembly comprises a pair of support bearings mounted on each side of the vehicle, an axle extending across the normal direction of movement of the vehicle, railroad wheels mounted on the ends of the axle, and a linkage assembly connected between each pair of support bearings at the sides of the vehicle and the axle. The linkage assemblies each include a wheel support arm pivotally connected at one of its ends to one of the support bearings and an actuating linkage connected between the other support bearing and the axle and which is foldable and unfoldable to move the axle and wheels through an arc to distend and retract the wheels beneath the vehicle. A fluid actuated ram is connected to one of the links in the actuating linkage and its ramrod is connected to the other link in the actuating linkage so that the retraction and distension of the ram folds and unfolds the linkage assembly, and the ram and actuating linkage are constructed to have their greatest downward effective force just as the wheels of the railroad wheel assembly engage the rails of the track and as the support arm and linkage assembly begin to support and stabilize the vehicle on the rails.

Thus, it is an object of this invention to provide a retractable and distensible railroad wheel assembly for road vehicles, such as for rotatable dumps and other load-carrying vehicles, which is fast-acting, reliable, and which provides a stable support for the vehicle on railroad tracks.

Another object of this invention is to provide a retractable and distensible railroad wheel assembly for self-propelled road vehicles which is reliable and inexpensive, which is retractable to a compact position where it is out of the way of the normal work functions of the vehicle, and which can be mounted on the front and on the rear of the vehicle.

Other objects, features and advantages of the present invention will become apparent upon reading the following specification, when taken in conjunction with the accomanying drawing.

BRIEF DESCRIPTION OF THE DRAWING

FIG. 4 is a rear view of the actuating linkage assembly.

DETAILED DESCRIPTION

Figure 1:
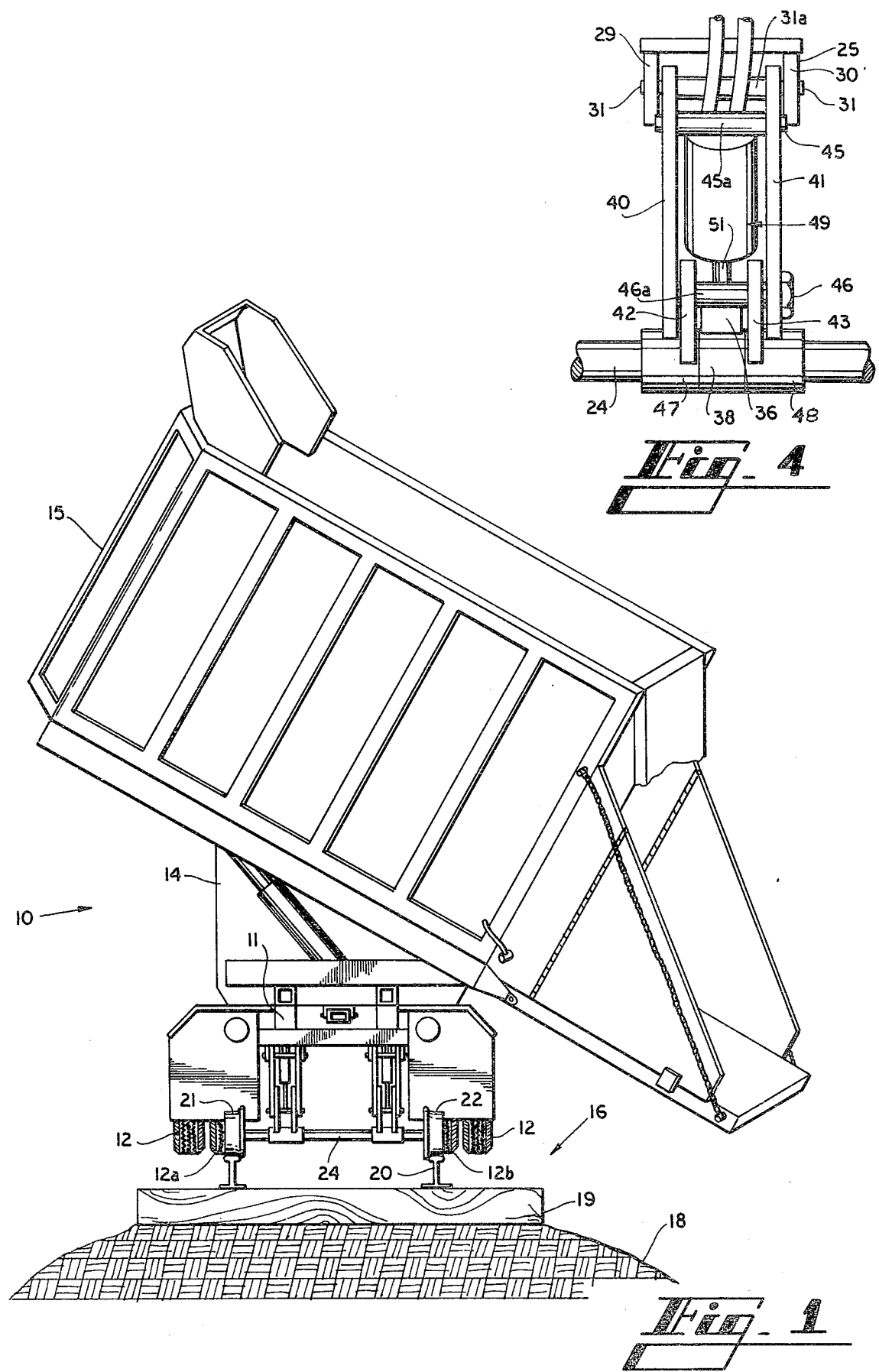
FIG. 1 is a rear view of a rotary dump vehicle and illustrates the retractable and distensible railroad wheel assembly mounted on the vehicle, showing the vehicle mounted on a railroad track with its dump body rotated and tilted.

Referring now in more detail to the drawing, in which like numerals indicate like parts throughout the several views, FIG. 1 illustrates a rotary dump load-carrying vehicle 10 which includes a vehicle framework 11, ground-engaging wheels 12 mounted on the framework, a passenger cab 14 and a rotatable and tiltable dump body 15. The vehicle 10 is illustrated as being mounted on and driven on a railroad track 16 which includes a ballast 18, crossties 19 and rails 20. A pair of railroad wheels 21 and 22 are located at the rear of the vehicle 10 and partially support and stabilize the vehicle from the railroad track 16, while the inner road-engaging wheels 12a and 12b also engage the rails 20 and function to partially support and to move the vehicle 10 along the length of the railroad track. An additional pair of railroad wheels (not shown in FIG. 1) are mounted on the vehicle frame 11 at the front portion of the vehicle ahead of the front steerable road wheels of the vehicle (not shown) and support and guide the front portion of the vehicle along the railroad track. The front and rear pair of railroad wheels are each mounted on a common axle, such as axle 24 of the rear pairs of wheels 21 and 22.

Figure 2:
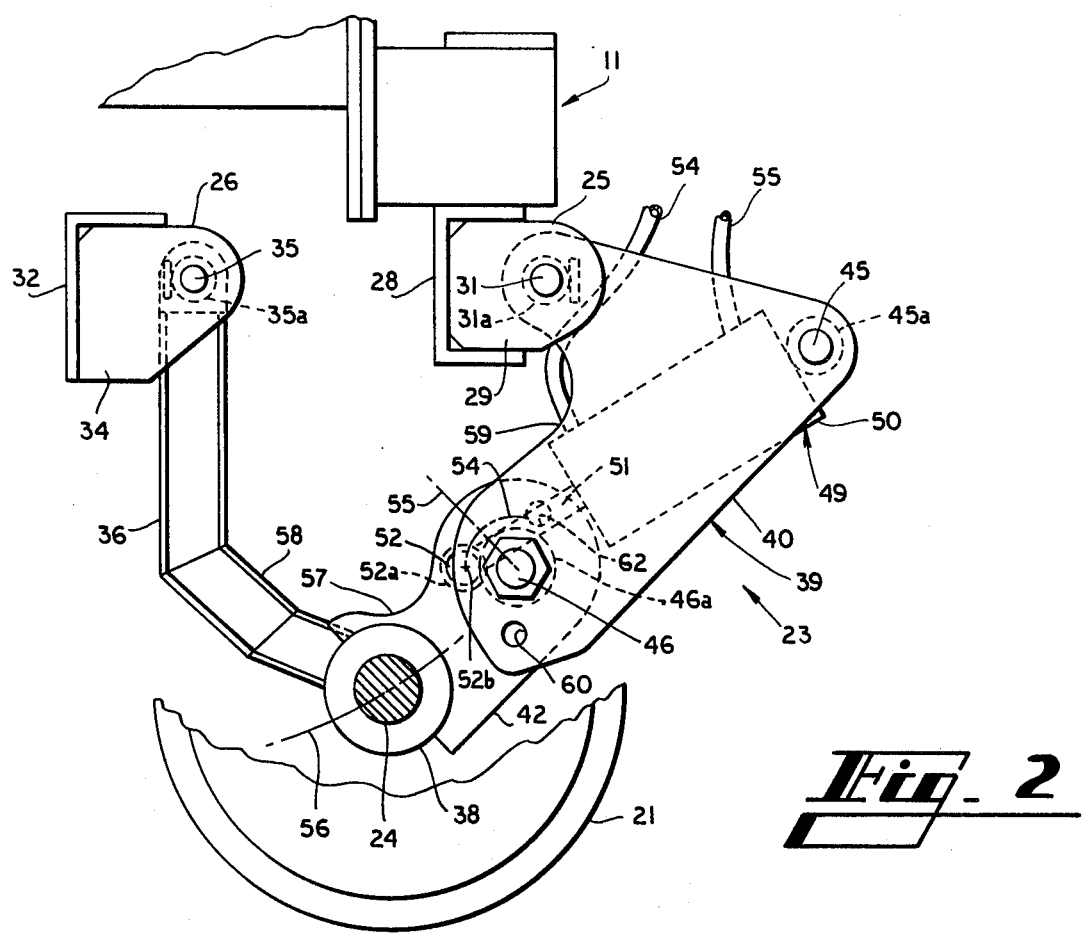
FIG. 2 is a side elevational view of the retractable and distensible railroad wheel assembly, illustrating one railroad wheel, the axle, one pair of support bearings, the wheel support arm and the actuating linkage and fluid actuated ram, with the wheel assembly shown in its downwardly distended position.

As illustrated in FIG. 2, the railroad wheel assembly 23 includes pairs of support bearings 25 and 26 connected to the undersurface of the framework 11 of the vehicle at opposite sides of the vehicle at the rear of the vehicle, and at opposite sides of the vehicle at the front of the vehicle (not shown). Support bearing 25 is a clevis assembly that comprises a bracket 28 and a pair of plates 29 and 30 (FIG. 4) extending from the open end of the bracket. Plates 29 and 30 define aligned openings therein and pivot pin 31 extends through the aligned openings. The support bearing 26 is similar to bearing 25 in that it is a clevis assembly that comprises a bracket 32 mounted on the lower surface of the framework 11 and a pair of spaced parallel plates 34 (only one shown) defining aligned openings through which pivot pin 35 extends. Bearing sleeves 31a and 35a surround the pivot pins 31 and 35, respectively.

Wheel support arm 36 is connected at one of its ends to support bearing 26 and at its other end to axle bearing 38 (FIG. 4) which surrounds the axle 24. Actuating linkage 39 comprises a pair of duplicate actuating plates 40 and 41 that function as actuating link means, and intermediate link plates 42 and 43 which function as intermediate link means. Actuating link plates 40 and 41 are approximately triangular in shape and define aligned openings for the receipt of pivot pin 31 of support bearing 25, mounting pin 45 and pivot pin 46. The pins 31, 45 and 46 are arranged in triangular relationship with respect to one another. Intermediate link plates 42 and 43 each define aligned openings for the receipt of pivot pin 46, and each link plate is rigidly connected to an axle bearing 47 and 48. Bearing sleeves 45a and 46a surround mounting pin 45 and pivot pin 46, and the intermediate link plates 42 and 43 are connected to the bearing sleeve 46a.

Fluid-actuated ram 49 comprises a cylinder 50 rigidly connected to the sleeve 45a of mounting pin 45 and a ramrod which is distensible and retractable with respect to the cylinder and which is connected at its outer end to actuating pin 52 and its bearing sleeve 52a. The intermediate link plates 42 and 43 define openings therein for the receipt of actuating pin 52, and the ramrod 51 is connected to the bearing sleeve 52a. A pair of fluid lines 54 and 55 are connected to opposite ends of the cylinder 50 for controlling the operation of fluid-actuated ram 49.

Figure 3:
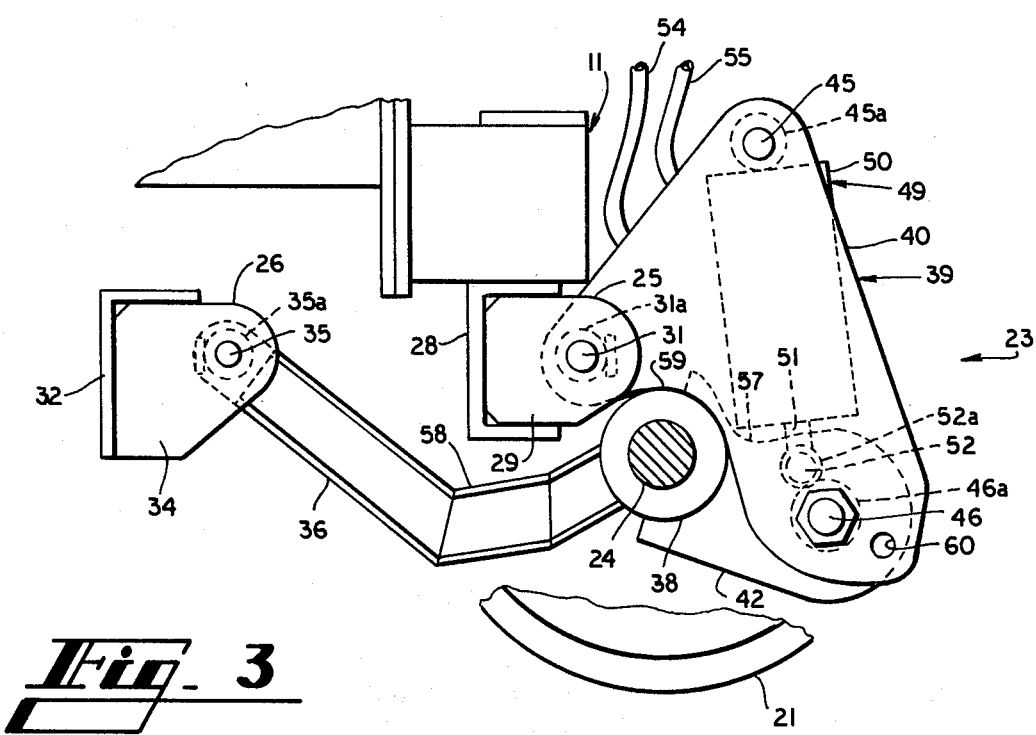
FIG. 3 is a side elevational view of the railroad wheel assembly, similar to FIG. 2, but showing the wheel assembly in its upward retracted position.

As illustrated in FIG. 2, the retraction and distension of ramrod 51 from cylinder 50 causes the actuating pin 52a to move through an arc 54 about pivot pin 46. The actuating pin 52 moves from a position beyond the pivot pin 46 when the ramrod is distended as illustrated in FIG. 2 through the arc 54 to a position where the actuating pin 52 is on the same side of the pivot pin 46 as is cylinder 50 and mounting pin 45 (FIG. 3). When the actuating pin 52 is located beside the pivot pin 46, as when the center 52b of the actuating pin 52 is located at reference line 55, the actuating pin is then at its most effective lever arm with respect to pivot pin 46 and fluid-actuated ram 49, so that the actuating linkage assembly 49 then exerts its greatest upward or downward movement with respect to axle 24 and the railroad wheels 21 and 22. This arrangement is for the purpose of causing the actuating linkage to have its greatest rotational force about the pivot pin 46 as the flanged steel railroad wheels 22 first contact the rails 20 of the railroad and begin to support the vehicle 10. As the intermediate link plates 42 and 43 rotate in a counterclockwise direction (FIGS. 2 and 3) progressively more toward an upright attitude, progressively less force is required to continue their rotation for a given load. Also, as the wheel support arm is moved progressively further down in a clockwise direction through its arc it moves progressively more toward an upright attitude and progressively less force is required to continue its rotation for a given load. Thus, the relationship of the parts of the linkage assembly causes the assembly to become progressively more able to lift a load as the railroad wheels engage the tracks and begin to lift more and more weight of the vehicle.

Wheel support arm 36 is curved along its length to form a concave recess 58 on its upper surface, and the pair of actuating link plates 40 and 41 define a concave recess 59 on their forward (FIG. 2) or lower (FIG. 3) surfaces. When the fluid-actuated ram 49 is retracted, the axle 24 moves upwardly through its arc 56 until the axle and its axle bearing 38 are located in the position illustrated in FIG. 3, which places the axle bearing 38 approximately behind the support bearing 25, with the upper portion of the axle bearing 38 being above the lowermost portion of the support bearing 25, and with the axle bearing 38 being received in the concave recesses 59 of the actuating link plates 40 and 41. The curved surface 58 of the wheel support arm 36 then extends beneath and about the support bearing 25. This locates the axle bearing 38 at a relatively high elevation with respect to the vehicle, so that the railroad wheels will be retracted upwardly and far away from the road surface.

Also, each of the intemediate link plates 42 and 43 define a concave recess 57 on its upper surface. When the fluid-actuated rams 49 are retracted and the wheel assemblies are retracted to their position shown in FIG. 3, the cylinders 49 will protrude into the recesses 57 of the intermediate link plates 42 and 43.

Aligned openings 60 are formed in actuating link plates 40 and 41, and similar aligned openings are formed in the intermediate link plates 42 and 43, and when the railroad wheel assembly is distended as illustrated in FIG. 2, the openings are aligned with each other and a pin is insertable through the openings to lock the actuating linkage 39 in its distended or down position. The intermediate link plates 42 and 43 also define second aligned openings 62, and when the wheel assembly is retracted as illustrated in FIG. 3, the second aligned openings 62 are aligned with the openings 60 in the actuating link plates 40 and 41, and the pin can be inserted through the aligned openings to lock the wheel assembly in its up or retracted position.

While this invention has been described in detail with particular reference to preferred embodiments thereof, it will be understood that variations and modifications can be effected within the spirit and scope of the invention as described hereinbefore and as defined in the appended claims.

I claim:

1. A wheel assembly for a vehicle including an axle and wheels mounted at the ends of the axle, said assembly comprising a retractable and distensible assembly for positioning at each wheel including a first support bearing assembly comprising a first support bearing pivot pin and first support plates for mounting said first bearing pivot pin on the vehicle, a second support bearing assembly comprising a second support bearing pivot pin and second support plates for mounting said second bearing pivot pin on the vehicle at a position longitudinally spaced from the first support bearing assembly along the normal direction of movement of the vehicle, a wheel support arm of a length greater than the distance between said first and second support bearing pivot pins pivotally mounted at one of its ends on said first support bearing pivot pin and curved along its length for supporting said axle at its other end so that when the wheel support arm is pivoted upwardly from a downwardly extending attitude to a laterally extending attitude the curved portion of the wheel support arm extends about the lower portion of said second support bearing assembly and at least a portion of the axle is positioned at a level above the lowest portion of said second support bearing assembly, an actuating link means pivotally connected to one of its end portions to said second support bearing pivot pin, an intermediate link means pivotally connected at one of its end portions to the other end portion of said actuating link means and constructed to be connected at its other end portion to said axle, a distensible and retractable fluid actuated ram connected at one of its ends to said actuating link means at a position on said actuating link means which is offset from between said second support bearing pivot pin and the connection between said actuating link means and said interemediate link means away from the axle and connected at the other of its ends to said intermediate link means at a position offset from the connection between said actuating link means and said intermediate link means, whereby retraction of said fluid actuated ram pivots said actuating link in an upward arc about the second support bearing pivot pin away from said first support bearing pivot pin, and lifts said intermediate link means, said wheel support arm and the axle upwardly.

2. The wheel assembly of claim 1 and wherein said intermediate link means comprises a recess therein movable to a position toward juxtaposition with said fluid actuated ram when the ram is retracted.

3. The wheel assembly of claim 1 and wherein actuating link means comprises a pair of spaced link plates, said fluid actuated ram comprises a cylinder and a ramrod with the cylinder located between the spaced link plates, said intermediate link means comprises a pair of spaced link plates positioned between the link plates of said actuating ram, and wherein the ramrod of said fluid actuated ram extends between the link plates of said intermediate link means.

4. A retractable and distensible railroad wheel assembly for adapting road vehicles to be mounted on railroad tracks comprising an axle for extending across the normal direction of movement of the vehicle, flanged steel wheels mounted at the ends of said axle, a pair of first and second support bearing assemblies for attachment to opposite sides of the vehicle, each said first support bearing assembly comprising a first support bearing pivot pin and first support plates for mounting said first support bearing pivot pin on the vehicle and each said second support bearing assembly comprising a second support bearing pivot pin and second support plates for attachment of said second support bearing pivot pin to the vehicle along the normal direction of movement of the vehicle from the first support bearing assembly, a retractable and distensible linkage assembly for each end of said axle, each linkage assembly comprising a wheel support arm pivotally connected at one of its ends to one of said first support bearing pivot pins and connected at its other end to said axle, said wheel support arm supporting said axle a distance away from said first support bearing pivot pin which is different from the distance between said first and second support bearing pivot pins so that said axle can be lifted to a height above the lower portion of said second support bearing assembly, an actuating link means pivotally connected at one of its pivot points to one of said second support bearing pivot pins and connected at a second pivot point displaced from its first pivot point to a third pivot pin, an intermediate link means pivotally connected at one of its pivot points to said axle and connected at another of its pivot points to said third pivot pin, a fluid actuated ram including a cylinder with its base mounted on said actuating link means and a distensible and retractable ramrod connected to said intermediate link means at a position offset from said third pivot pin, whereby when a road vehicle with the wheel assembly attached is positioned over a railroad track and the ramrods of the fluid actuated rams are distended the intermediate link means of each linkage assembly folds out away from the actuating link means and pivots the wheel support arms and axle downwardly through an arc toward engagement with the rails of the railroad track until the axle, third pivot pin and cylinder base are moved into approximate alignment and the connection point of the ramrod with the intermediate link means is moved beyond the third pivot pin and when the ramrods of the fluid actuated rams are retracted the intermediate link means of each linkage folds inwardly toward the actuating link means and pivots the wheel support arms and axle upwardly through an arc away from engagement with the rails of the railroad track until a portion of the axle is lifted to a height above the lower portion of the second support bearing assemblies.

5. A retractable and distensible railroad wheel assembly for road vehicles comprising an axle, flanged steel wheels mounted at opposite ends of said axle, a pair of first and second support bearings for attachment to opposite sides of a vehicle with the second support bearings mounted along the normal direction of movement of the vehicle from the first support bearings, a retractable and distensible linkage assembly for each end of said axle for raising and lowering the railroad wheels, each linkage assembly comprising a wheel support arm pivotally connected at one of its ends to one of said first support bearings and connected at its other end to said axle, an actuating link means pivotally connected at a first pivot point to the second support bearing positioned in alignment with the first support bearing pivot point displaced from said first pivot point, an intermediate linkage means connected to said axle, a pivot pin extending through said actuating link means at said second pivot point and through said intermediate link means at a position displaced from said axle, a fluid actuated ram including a cylinder mounted on and movable with said actuating link means at a point in triangular relationship with respect to the first and second pivot points and a distensible and retractable ramrod connected to said intermediate link means at a point adjacent said pivot pin with the ramrod connection to said intermediate link means movable about said pivot pin between a position approximately level with the pivot pin when the wheels are distended and a position approximately above the pivot pin when the wheels are retracted.

6. A retractable and distensible railroad wheel assembly for adapting road vehicles to be mounted on railroad tracks, said railroad wheel assembly comprising an axle for positioning beneath a vehicle and extending across the normal direction of movement of the vehicle for supporting flanged steel railroad wheels at its opposite end portions, a pair of support bearings for mounting on each side of the vehicle, a linkage assembly for connection between each pair of support bearings and said axle comprising a wheel support arm pivotally connected at one of its ends to a first one of said support bearings and connected at its other end to said axle, an actuating linkage connected to the other of the support bearings, an intermediate linkage means connected at one of its ends to said axle and pivotally connected at the other of its ends to said actuating linkage, a fluid actuated ram mounted on said actuating linkage and pivotally connected to said intermediate linkage at a pivot point displaced from the pivotal connection of said intermediate linkage and said actuating linkage for folding and unfolding said intermediate linkage and said actuating linkage and thereby moving said axle and wheels in an arc about the first support bearings between a position where the wheels are retracted upwardly beneath the vehicle above the ground surface and a position where the wheels are distended downwardly beneath the vehicle for engagement with railroad tracks for supporting the vehicle on the railroad track, said ram being oriented on said actuating linkage and being connected to said intermediate linkage at a position such that the ram exerts a force on said intermediate linkage that is approximately tangential to the arc of movement of the pivotal connection of said ram to said intermediate linkage about the pivotal connection between said intermediate linkage and said actuating linkage approximately as the flanged steel railroad wheels first contact the rails of the railroad and begin to support the vehicle.

* * * * *